US009065613B2

(12) United States Patent
Kim et al.

(10) Patent No.: US 9,065,613 B2
(45) Date of Patent: Jun. 23, 2015

(54) APPARATUS AND METHOD FOR SUPPORTING E-MBS SERVICE IN MULTICARRIER SYSTEM

(75) Inventors: Jeongki Kim, Gyeonggi-Do (KR); Kiseon Ryu, Gyeonggi-Do (KR); Youngsoo Yuk, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 13/519,689

(22) PCT Filed: Jan. 11, 2011

(86) PCT No.: PCT/KR2011/000188
§ 371 (c)(1),
(2), (4) Date: Jun. 28, 2012

(87) PCT Pub. No.: WO2011/087257
PCT Pub. Date: Jul. 21, 2011

(65) Prior Publication Data
US 2012/0294222 A1 Nov. 22, 2012

Related U.S. Application Data

(60) Provisional application No. 61/294,115, filed on Jan. 12, 2010, provisional application No. 61/324,274, filed on Apr. 14, 2010, provisional application No. 61/329,516, filed on Apr. 29, 2010, provisional application No. 61/362,290, filed on Jul. 7, 2010.

(30) Foreign Application Priority Data

Dec. 23, 2010 (KR) .................. 10-2010-0133679

(51) Int. Cl.
*H04W 4/00* (2009.01)
*H04L 5/00* (2006.01)
(Continued)

(52) U.S. Cl.
CPC ............. *H04L 5/0048* (2013.01); *H04L 5/0007* (2013.01); *H04L 5/001* (2013.01);
(Continued)

(58) Field of Classification Search
CPC .......... H04W 4/00; H04W 8/06; H04W 4/12; H04W 72/0413; H04W 36/06; H04W 76/02; H04W 72/005; H04W 72/042; H04H 20/71; H04L 5/0048; H04L 5/0098; H04L 5/001; H04L 5/0007
USPC .......................... 370/328–338, 431–463, 312
See application file for complete search history.

(56) References Cited

U.S. PATENT DOCUMENTS 7,630,725 B2   12/2009 Kwak et al.
7,873,044 B2 *  1/2011 Kang et al. .................. 370/390
(Continued)

FOREIGN PATENT DOCUMENTS

CN            101273601 A    9/2008
KR    10-2003-0032780 A    4/2003
(Continued)

OTHER PUBLICATIONS

Kim et al., "E-MBS Operation in Multicarrier Deployment in IEEE P802.16m (16.9.2)", IEEE C802.16m-10/0917, Jul. 9, 2010.
(Continued)

*Primary Examiner* — Chandrahas Patel
*Assistant Examiner* — Lan Huong Truong
(74) *Attorney, Agent, or Firm* — Birch, Stewart, Kolasch & Birch, LLP (57) ABSTRACT

Disclosed is a method for operating a terminal for receiving E-MBS (enhanced-multicast and broadcast service) service in a multicarrier system, the method comprising: establishing E-MBS service connection with a base station; sending, to the base station, a first message including report mode information when the terminal receives E-MBS service from the base station; wherein the report mode information indicates the terminal requests the base station to assign a carrier switching operation start time, receiving, from the base station, a second message including the carrier switching operation start time information requested by the terminal; and starting a carrier switching operation based on the received carrier switching operation start time information.

10 Claims, 3 Drawing Sheets

(51) Int. Cl.
  *H04W 36/06* (2009.01)
  *H04W 72/00* (2009.01)
  *H04W 72/04* (2009.01)
  *H04W 76/02* (2009.01)
  *H04W 4/12* (2009.01)

(52) U.S. Cl.
  CPC ............ *H04L 5/0098* (2013.01); *H04W 36/06* (2013.01); *H04W 72/005* (2013.01); *H04W 72/0413* (2013.01); *H04W 72/042* (2013.01); *H04W 76/02* (2013.01); *H04W 4/12* (2013.01)

(56) References Cited

U.S. PATENT DOCUMENTS

| 8,473,984 | B1* | 6/2013 | Harmon et al. ................. 725/46 |
| 2003/0088695 | A1 | 5/2003 | Kwak et al. |
| 2006/0126590 | A1* | 6/2006 | Putcha et al. ................. 370/343 |
| 2006/0239265 | A1* | 10/2006 | Son et al. ...................... 370/390 |
| 2008/0192675 | A1* | 8/2008 | Kim et al. ...................... 370/320 |
| 2008/0267109 | A1* | 10/2008 | Wang et al. ................... 370/312 |
| 2008/0268878 | A1* | 10/2008 | Wang et al. ................... 455/458 |
| 2009/0109890 | A1* | 4/2009 | Chow et al. .................. 370/312 |
| 2009/0213957 | A1 | 8/2009 | Chen et al. |
| 2010/0061285 | A1* | 3/2010 | Maeda et al. ................. 370/312 |
| 2010/0097973 | A1* | 4/2010 | Wu et al. ...................... 370/312 |
| 2010/0302989 | A1 | 12/2010 | Sung et al. |
| 2011/0021224 | A1* | 1/2011 | Koskinen et al. ............. 455/507 |

FOREIGN PATENT DOCUMENTS

| KR | 10-0464351 B1 | 1/2005 |
| KR | 10-2009-0082159 A | 7/2009 |
| RU | 2316912 C2 | 2/2008 |
| WO | WO 2007/038729 A2 | 4/2007 |

OTHER PUBLICATIONS

Kim et al., "Proposed Text on the E-MBS Operation in Alternative Carrier in IEEE P802.16m (16.9.2)", IEEE C802.16m-10/0191, Mar. 5, 2010.

Kim et al., "Proposed Text for E-MBS Operation for Carrier Switching Mode (16.2.3/16.9.2.2)," IEEE C802.16m-10/1005, Aug. 12, 2010, 9 pages.

Li et al., "Proposed Text for E-MBS Operation for Multicarrier Deployment (P802.16m/D2-15.9.2.1)," IEEE C802.16m-09/2493, Nov. 6, 2009, 4 pages.

* cited by examiner

APPARATUS AND METHOD FOR SUPPORTING E-MBS SERVICE IN MULTICARRIER SYSTEM

CROSS REFERENCE TO RELATED APPLICATIONS

This application is the National Phase of PCT/KR2011/000188 filed on Jan. 11, 2011, which claims priority under 35 U.S.C. 119(e) to U.S. Provisional Application Nos. 61/294,115 filed on Jan. 12, 2010, 61/324,274 filed on Apr. 14, 2010, 61/329,516 filed on Apr. 29, 2010 and 61/362,290 filed on Jul. 7, 2010 and under 35 U.S.C. 119(a) to Patent Application No. 10-2010-0133679 filed in Republic of Korea on Dec. 23, 2010, all of which are hereby expressly incorporated by reference into the present application.

TECHNICAL FIELD

This specification relates to an apparatus and method for supporting an enhanced multicast and broadcast service (E-MBS) in a multicarrier system, and more particularly, an apparatus and method for performing a carrier switching operation for E-MBS service reception.

BACKGROUND ART

General Multicarrier System

Figure 1A:
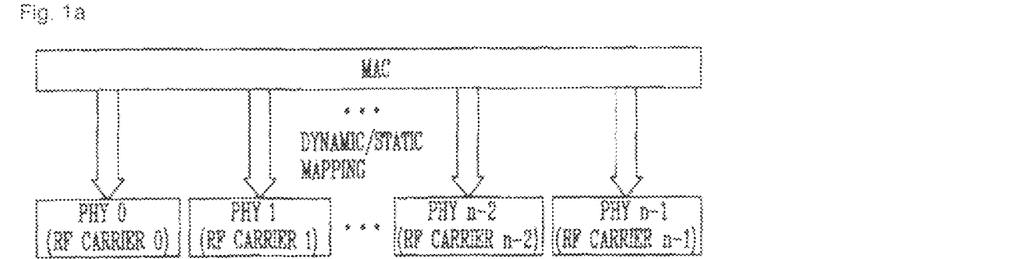
FIGS. 1(a) and 1(b) are views showing a signal transmission and reception method based upon a multiband radio frequency (RF)
Figure 1B:
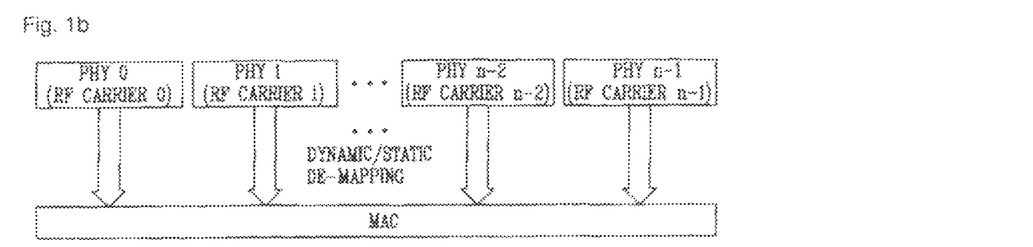

A multicarrier system described herein indicates that one or more individual carriers are used as a group. FIGS. 1(a) and 1(b) show a signal transmission and reception method based upon a multiband radio frequency (RF).

For efficient use of multiband (or multicarrier), a technique has been proposed in which one medium access control (MAC) entity handles multiple carriers (e.g., several frequency allocation (FA)).

As shown in FIG. 1, one MAC layer in each of a transmitting end and a receiving end may manage several carriers for efficient multicarrier use. Here, for effective transmission and reception of the multicarrier, it is assumed that both the transmitting and receiving ends can transmit and receive multicarrier. Since frequency carriers (FCs) managed by one MAC layer do not have to be contiguous to one another, it may be flexible in view of resource management.

That is, a contiguous aggregation and a non-contiguous aggregation are all available.

Referring to FIGS. 1(a) and 1(b), PHY0, PHY1, PHY n−2, PHY n−1 denote multiband according to this technique, and each band may have a magnitude (bandwidth) of FA assigned for a specific service according to a predefined frequency policy.

For example, PHY0 (RF carrier 0) may have a bandwidth of FA assigned for a typical FM radio broadcast, and PHY1 (RF carrier 1) may have a bandwidth of FA assigned for cellular phone communications.

Each frequency band may have a different frequency bandwidth according to each frequency band characteristic. However, it may be assumed in the following description, for the sake of brief explanation, that each FA has A [MHz] magnitude.

Also, each FA may be represented as a carrier frequency for using a baseband signal at each frequency band. Hereinafter, each FA is referred to as "carrier frequency band" or, if not ambiguous, simply as "carrier" representing each carrier frequency band.

As shown in 3GPP LTE-A in recent time, to distinguish the carrier from a subcarrier used in a multicarrier technique, the carrier may be referred to as "component carrier."

In this regard, the "multiband" technique may be referred to as "multicarrier" technique or "carrier aggregation" technique.

In order to send signals via multiband as shown in FIG. 1(a) and receive signals via the multiband as shown in FIG. 1(b), the transmitting and receiving ends are required to include RF modules, respectively, for transmission and reception of signals over the multiband. Also, in FIG. 1, the configuration of "MAC" may be decided by a base station regardless of downlink (DL) and uplink (UL).

Briefly explaining, this technique indicates that one MAC entity (hereinafter, simply referred to as "MAC" if not obscure) manages/runs a plurality of RF carriers (radio frequencies) for signal transmission and reception. Also, the RF carriers managed by the one MAC may not have to be continuous to each other. Hence, in accordance with this technique, it is more flexible in view of resource management.

In IEEE 802.16m system as one of wireless communication systems, the carriers may be divided into two carrier types from the perspective of a base station. For example, the carrier types may be divided into a fully configured carrier type (FCCT) and a partially configured carrier type (PCCT).

The FCCT indicates a carrier by which every control information and data can be sent or received, and the PCCT indicates a carrier by which only downlink (DL) data can be sent or received. Here, the PCCT may be used for services, such as an enhanced multicast broadcast service (E-MBS), which usually provides DL data.

From the perspective of a mobile terminal, assigned carriers may be divided into two types, for example, a primary carrier type and a secondary carrier type. Here, the mobile terminal may be allocated with one primary carrier and a plurality of subcarriers from the base station.

The primary carrier may be selected from the fully configured carriers. Most of essential control information related to the mobile terminal may be sent on the primary carrier. The subcarriers may be selected from the fully configured carriers or the partially configured carriers, and also additionally allocated in response to request of the mobile terminal or instruction of the base station.

The mobile terminal may send and receive not only every control information but also control information related to the subcarriers over the primary carrier, and exchange (transceive) data with the base station over the subcarriers. Here, the subcarrier, as a fully configured carrier, allocated to a specific mobile terminal, may be set to a primary carrier of another mobile terminal.

Multicarrier Switching

Multicarrier switching indicates a multicarrier mode for a terminal to switch a physical layer connection from a primary carrier to a partially configured subcarrier or a fully configured subcarrier. Here, the carrier switching of the terminal may be performed based upon instruction (indication) from a base station in order to receive E-MBS service at a subcarrier.

After being connected to the subcarrier for a specific time, the terminal may move back to the primary carrier. While the terminal is connected to the subcarrier for the specific time, the terminal does not have to maintain transmission or reception via the primary carrier.

Basic Multicarrier (MC) Mode

A basic multicarrier (MC) mode indicates a mode that a terminal operates using only one carrier. However, the terminal may support not only optimized scanning for carriers related to a multicarrier operation but also a primary carrier switching procedure.

Carrier Switching Operation for E-MBS Service

E-MBS service may be performed by a specific carrier (e.g., secondary carrier (E-MBS carrier)) other than a primary carrier. In a connected state with a base station, an E-MBS terminal having only one transceiver (i.e., a terminal operating in a carrier switching mode) may perform carrier switching from a primary carrier to another carrier to receive E-MBS data burst, E-MBS configuration message and E-MBS MAP, and carrier switching from the another carrier to the primary carrier to receive a unicast service from the base station.

The E-MBS terminal may perform a carrier switching operation based upon its E-MBS subscription information assigned from the base station to the terminal during a dynamic service addition (DSA) procedure. The E-MBS subscription information may be MSTIDs and FIDs, for example.

In an actual E-MBS environment, basic (default) E-MBS channels may be assigned (allocated) to every terminals subscribed in the E-MBS service, and the number of default E-MBS channels may be much more than the number of specific E-MBS channels (e.g., premium channels).

- all the E-MBS terminals subscribe in all the default contents via default free channels.
- Additionally, some premium users may subscribe in premium contents.

In other words, E-MBS terminals subscribed in the premium contents may stay longer in the E-MBS carrier than terminals merely subscribed in the default contents.

Figure 2:
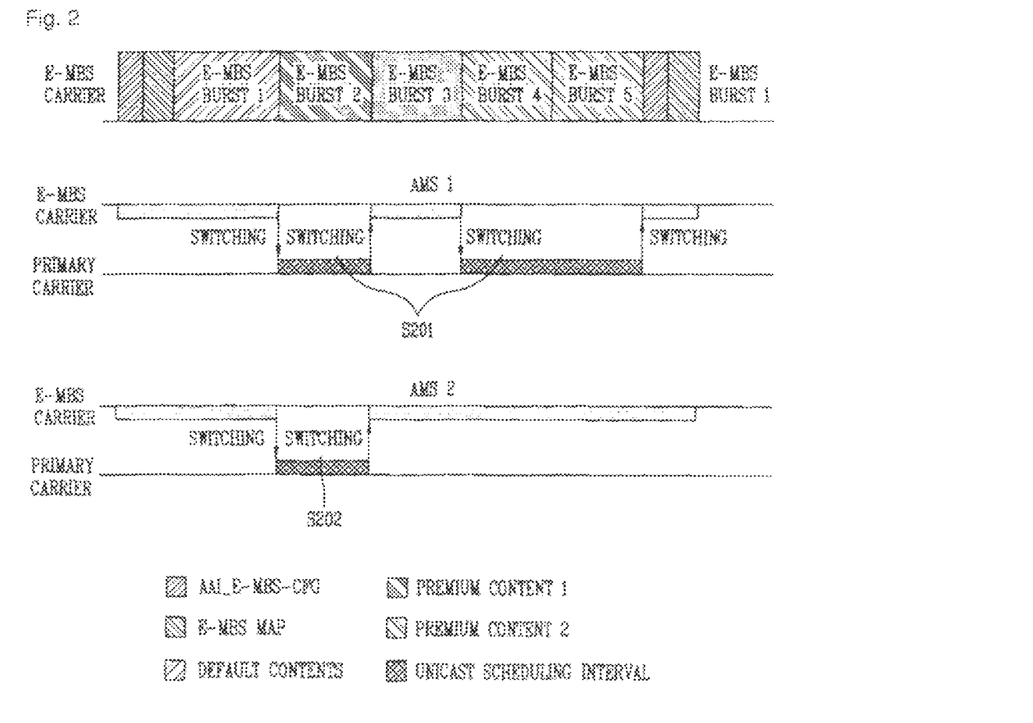
FIG. 2 is a flowchart showing a carrier switching operation performed based upon terminal subscription information.

FIG. 2 is a flowchart showing a carrier switching operation performed based upon terminal subscription information.

As shown in FIG. 2, it is assumed that a terminal 1 merely subscribed in default contents and a terminal 2 subscribed in the default contents and a premium content 2.

It is also assumed that E-MBS data bursts 1 and 3 are data for the default contents, E-MBS data burst 2 is data for a premium content 1, and E-MBS data bursts 4 and 5 are data for the premium content 2.

Referring to FIG. 2, the terminal 1 may stay at a primary carrier while a base station sends E-MBS data bursts 2, 4 and 5 (S201), and the terminal 2 may stay at a primary carrier while the base station sends E-MBS data burst 2 (S202). That is, the base station may allocate unicast resources to terminals, which have subscribed in the premium contents having the lowest unicast scheduling efficiency.

During free E-MBS service, a terminal may not need to perform a joining/leaving process at an upper layer. That is, in this case, when E-MBS terminal starts or ends E-MBS service reception, DSA/dynamic service deletion (DSD) process may not be performed. However, in the carrier switching mode, the base station must be known of whether a terminal is receiving the E-MBS service for efficient unicast scheduling. If the terminal is not receiving the E-MBS service, the base station may provide the unicast service to the terminal at the primary carrier at any time.

However, regarding the existing carrier switching operation, when the terminal subscribes in the E-MBS service and is in a connected mode with the base station, the terminal performs the carrier switching operation between a primary carrier and a secondary carrier (E-MBS carrier) regardless of the reception of the E-MBS service.

Here, in a state that the terminal subscribed in the E-MBS service is in the connected mode, if the terminal operates in the carrier switching mode even when not receiving the E-MBS service, the base station may not effectively schedule the unicast resource to the terminal (particularly, it may not guarantee QoS upon using VoIP), and the terminal may cause power consumption due to performing of the unnecessary carrier switching operation.

DISCLOSURE OF INVENTION

Solution to Problem

Therefore, to obviate the problems, an aspect of the detailed description is to provide an apparatus and method in which a terminal in a carrier switching mode performs a carrier switching according to whether or not the terminal receives an E-MBS service.

To achieve these and other advantages and in accordance with the purpose of this specification, as embodied and broadly described herein, there is provided a method for operating a terminal for receiving E-MBS (enhanced-multicast and broadcast service) service in a multicarrier system, the method comprising: establishing E-MBS service connection with a base station; sending, to the base station, a first message including report mode information when the terminal receives E-MBS service from the base station; wherein the report mode information indicates the terminal requests the base station to assign a carrier switching operation start time, receiving, from the base station, a second message including the carrier switching operation start time information requested by the terminal; and starting a carrier switching operation based on the received carrier switching operation start time information.

The carrier switching operation is that the terminal switches to the secondary carrier periodically to receive E-MBS data in a subscribed E-MBS service interval and switches a primary carrier to receive a unicast service in a non-subscribed E-MBS service interval.

The carrier switching operation start time information is 4 least significant bits of superframe number at which the terminal starts carrier switching operation.

The method may further include transmitting, to the base station, a first message including report mode information when the terminal terminates the E-MBS service; wherein the report mode information indicates the terminal ends the carrier switching operation, receiving, from the base station, a second message in response to the first message; and stoping the carrier switching operation when the terminal receives the second message.

After the terminal stops the carrier switching operation, the terminal stays in the primary carrier until the terminal starts carrier switching operation again.

The establishing of the E-MBS service connection with the base station may include sending a DSA (dynamic service addition) request message to the base station to request the E-MBS service connection establishment; and receiving a DSA response message from the base station responsive to the DSA request message.

The establishing of the E-MBS service connection with the base station may include receiving an unsolicited DSA request message for requesting the E-MBS service connection establishment from the base station; and sending a DSA response message to the base station responsive to the unsolicited DSA response message.

The first message may be an E-MBS report message (AAI_E-MBS-REP).

The second message may be an E-MBS response message (AAI_E-MBS-RSP).

This specification provides a terminal for receiving E-MBS service in a multicarrier system, the terminal comprising: a transmitting unit configured to send, to a base station, a first message including report mode information when the terminal establishes E-MBS service connection with a base station and the terminal receives E-MBS service from the base station; wherein the report mode information indicates the terminal requests the base station to assign a carrier switching operation start time, a receiving unit configured to receive, from the base station, a second message including the carrier switching operation start time information requested by the terminal; and a controller configured to provide control to start a carrier switching operation based on the received carrier switching operation start time information.

The controller may control the transmitting unit to transmit, to the base station, a first message including report mode information when the terminal terminates the E-MBS service, wherein the report mode information indicates the terminal ends the carrier switching operation, and controls the receiving unit to receive, from the base station, a second message in response to the first message, and provides control to stop the carrier switching operation when the terminal receives the second message.

The controller may control the receiving unit to receive, from the base station, a unicast service on the primary carrier until the terminal starts carrier switching operation again after the terminal stops the carrier switching operation.

The controller may control the receiving unit to receive, from the base station, a unicast service on the primary carrier before the terminal starts carrier switching operation.

The first message may be an E-MBS report message (AAI_E-MBS-REP).

The second message may be an E-MBS response message (AAI_E-MBS-RSP).

Advantageous Effects of Invention

In accordance with this specification, a terminal, which is in a carrier switching mode, can terminate the carrier switching mode when it does not receive an E-MBS service, such that the base station can effectively provide a unicast scheduling to the terminal and power consumption can be reduced due to the terminal not having to perform an unnecessary carrier switching operation.

MODE FOR THE INVENTION

Reference will now be made in detail to the preferred embodiments of this specification, examples of which are illustrated in the accompanying drawings. It should be understood that the description herein will be given of essential parts required to understand operations according to this specification and description of the other parts will be omitted to obviate obscurity of the point of the invention.

The exemplary embodiments herein are combinations of components and characteristics in certain forms. Each component or characteristic should be considered to be optional unless being explicitly described. Each component or characteristic may be embodied in the form of non-combination with other components or characteristics. Also, the exemplary embodiments can be implemented by combination of part of components and/or characteristics. The sequence of operations described in the exemplary embodiments may differ. Part of configurations or characteristics in one exemplary embodiment will be included in another exemplary embodiment, or be replaced with corresponding configurations or characteristics in another embodiment.

The exemplary embodiments in this specification are described herein on the basis of relation of data transmission and reception between a base station and a terminal. Here, the base station may indicate a terminal node of a network, which performs communications directly with the terminal. Specific operations, which will be described as being performed by the base station in this specification, may be performed by an upper node of the base station.

That is, it is obvious that in a network comprising a plurality of network nodes including the base station, various operations performed for communications with the terminal can be performed by the base station or different network nodes other than the base station. 'Base station' will be replaced with other terms, such as a fixed station, Node B, eNode B (eNB), access point and the like. Also, 'terminal' may be replaced with other terms, such as user equipment (UE), mobile station (MS), mobile subscriber station (MSS) and the like.

The exemplary embodiment described herein may be embodied by various means.

For example, the exemplary embodiments may be implemented by hardware, firmware, software, or combination of them.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors.

For firmware or software implementation, the method according the exemplary embodiments described herein may be implemented in the form of module, procedure, function or the like, which performs functions or operations described above. Software codes may be stored in a memory unit to be operated by a processor. The memory unit may be present inside or outside the processor, to exchange (transceiver) data with the processor via various means, which have been already known.

Specific terms used in the following description are provided for better understanding of the specification, and use of such terms may be changed into different forms within the scope of this invention.

Hereinafter, description will be given in detail of a method in which a terminal performs a carrier switching mode depending on whether or not it receives E-MBS service.

First, the carrier switching mode is an interval in which the terminal performs a carrier switching operation. As the terminal reports start or end of the E-MBS service reception to the base station, the carrier switching mode may be started or ended.

Also, the carrier switching mode indicates that the terminal performs a carrier switching operation between a primary carrier and a secondary carrier (E-MBS carrier), namely, the terminal receives E-MBS bursts via the secondary carrier in a subscribed E-MBS service interval, and receives a unicast service allocated via the primary carrier in a non-subscribed E-MBS service interval.

Carrier Switching Operation Through DSA Procedure (E-MBS Service Reception)

Figure 3:
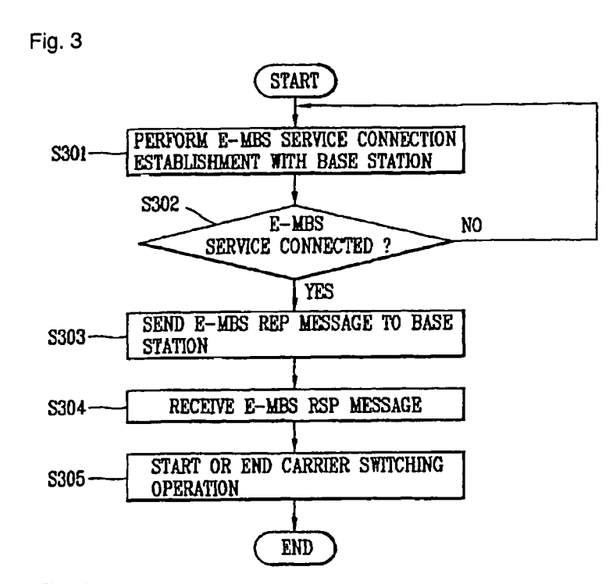
FIG. 3 is a flowchart showing that a terminal performs a carrier switching mode depending on E-MBS reception.

A terminal may perform a dynamic service addition (DSA) operation for establishing E-MBS service connection with the base station (S301). Here, the terminal may perform the DSA operation with the base station to exchange information, which are needed for E-MBS service connection and reception.

That is, the terminal may send DSA-REQ message to the base station to establish the E-MBS service connection. Here, the DSA-REQ message may alternatively be sent from the base station to the terminal for the E-MBS connection establishment. In general, the base station may send an unsolicited DSA-REQ message to the terminal to establish E-MBS service connection with the terminal.

Next, if the terminal sends the DSA-REQ message to the base station to start establishing the E-MBS service connection, the base station may send DSA-RSP message to the terminal in response to the E-MBS service connection request. Here, when the base station sends the unsolicited DSA-REQ message to the terminal, the terminal may send DSA-RSP message to the base station in response to the E-MBS service connection request.

Also, the DSA-RSP message or unsolicited DSA-REQ message received by the terminal may include carrier switching mode information. The carrier switching mode information may indicate a carrier switching operation based upon unicast available interval information included in the DSA message or a carrier switching operation based upon parameters using an E-MBS REP message.

During the DSA procedure between the terminal and the base station, other messages (e.g., DSA-ACK) required for the DSA procedure as well as the DSA-REQ message and the DSA-RSP message may also be sent or received.

The terminal may become a state capable of receiving the E-MBS service from the base station through the DSA procedure with the base station.

That is, if the terminal, which subscribed in the E-MBS service, is in a connected mode with the base station (S302), the terminal can receive the E-MBS service from the base station by performing the carrier switching operation.

Hereinafter, detailed description will be given of a procedure that the terminal in a connected mode performs the carrier switching mode through E-MBS REP/RSP message.

The terminal may send an E-MBS report message (AAI_E-MBS-REP) including report mode information to the base station (S303). The report mode information may correspond to information indicating that the terminal starts, changes or ends the E-MBS service. Also, the E-MBS report message may correspond to a MAC control message.

That is, the terminal may report to the base station, through the E-MBS report message, on the start of the E-MBS service, the change of the E-MBS service or the end of the E-MBS service.

Table 1 shows an exemplary format of AAI_E-MBS-REP message.

Table 1

TABLE 1

| Syntax | Size (Bit) | Notes | Conditions |
|---|---|---|---|
| AAI_E-MBS-REP_Message_Format ( ) { | | | |
| MAC Control Message Type | 8 | AAI_E-MBS-REP | |
| E-MBS Zone ID | 7 | | |
| Report mode | 2 | Indicates the AMS starts/changes/ends E-MBS 0b00: AMS requests ABS to assign a carrier switching start time (AMS starts receiving the E-MBS data) 0b01: AMS updates E-MBS connection Bitmap 0b10: AMS ends E-MBS carrier switching (AMS ends receiving the E-MBS data) 0b11: reserved | |
| ... | ... | ... | ... |

As shown in Table 1, as one example, if a report mode included in the E-MBS REP message sent by the terminal is set to '0b00,' it indicates that the terminal starts receiving E-MBS service. Therefore, upon reception of the E-MBS REP message having the report mode set to '0b00,' the base station may recognize that the terminal starts receiving E-MBS service.

That is, the E-MBS REP message may indicate that the terminal requests for assignment of a carrier switching start time from the base station for performing the carrier switching mode.

Accordingly, the base station may determine that the terminal starts the carrier switching (E-MBS service reception), thereby sending E-MBS-RSP message including carrier switching start time information to the terminal for assigning the carrier switching start time to the terminal.

Here, the carrier switching start time information may indicate 4 least sequence bits (LSBs) of a superframe number, at which the terminal switches carriers to receive the E-MBS service on a secondary carrier (E-MBS carrier).

Also, if the report mode is set to '0b10,' it indicates that the terminal ends the E-MBS service reception.

Hence, upon reception of the E-MBS REP message having the report mode set to '0b10,' the base station may determine that the terminal has ended the carrier switching (E-MBS service reception) mode, and thus send E-MBS-RSP message to the terminal responsive to the E-MBS REP message.

The terminal may then receive an E-MBS response message (AAI_E-MBS RSP) from the base station responsive to the E-MBS REP message (S304). As aforesaid, when sending the E-MBS REP message to the base station to report the start of the E-MBS service reception, the E-MBS response message sent by the base station includes the carrier switching start time information.

Also, the E-MBS response message may include report mode information, which is sent by the base station to indicate start, change or end of the E-MBS service to the terminal.

That is, when the terminal receives the E-MBS response message including the report mode information from the base station, the terminal may start or end the carrier switching mode based upon the report mode information, and also change (update) E-MBS service connection information.

If the terminal is receiving the E-MBS service, the base station may assign a unicast resource to the terminal via a primary carrier based upon the carrier switching operation of the terminal. When the terminal ends the E-MBS service reception, the carrier switching operation of the terminal is not performed, and the base station may assign the unicast resource to the terminal at the primary carrier until the terminal starts the carrier switching operation.

Table 2 shows an exemplary format of AAI_E-MBS-RSP message.

Table 2

TABLE 2

| Field | Size (Bits) | Value/Description | Conditions |
|---|---|---|---|
| MAC Control Message Type | 8 | AAI_E-MBS-RSP | |
| Carrier switching start time | 4 | 4 LSBs of superframe number at which the AMS switches carrier to receive E-MBS data on the secondary carrier. | Present when the report mode is 0b00. |
| ... | ... | ... | ... |

As shown in Table 2, if the E-MBS REP message sent by the terminal informs that the terminal starts receiving the E-MBS service, a carrier switching start time field may be included in the AAI_E-MBS-RSP message.

Table 3 shows another exemplary format of AAI_E-MBS-RSP message including report mode information.

Table 3

TABLE 3

| Field | Size (Bits) | Value/Description | Conditions |
|---|---|---|---|
| MAC Control Message Type | 8 | AAI_E-MBS-RSP | |
| Report mode | 2 | Indicates the AMS starts/changes/ends E-MBS 0b00: AMS requests ABS to assign a carrier switching start time 0b01: AMS updates E-MBS connection Bitmap 0b10: AMS ends E-MBS earner switching 0b11: reserved | |
| Carrier switching start time | 4 | 4 LSBs of superframe number at which the AMS switches carrier to receive E-MBS data on the secondary carrier. | Present when the report mode is 0b00. |
| ... | ... | ... | ... |

As shown in Table 3, it can be noticed that the AAI_E-MBS-RSP message sent by the base station includes the report mode field indicating start, change or end of the E-MBS service to the terminal.

Next, the terminal may start the carrier switching mode or end the carrier switching mode, in which the terminal is operating, based upon whether or not the terminal receives the E-MBS service (S305).

That is, when starting the E-MBS service reception, the terminal may inform the base station of the start of the E-MBS service and then start the E-MS service reception and the carrier switching operation. In other words, the terminal in the carrier switching mode may notify the base station that it starts the carrier switching operation.

Also, upon ending the E-MBS service reception, the terminal may notify it to the base station and end the carrier switching operation. That is, the terminal in the carrier switching mode may notify the base station that it ends the carrier switching operation.

That is, the terminal operates in the carrier switching mode only when receiving the E-MBS service, and switches to the primary carrier when ending the reception of the E-MBS service so as to stay at the primary carrier until receiving the E-MBS service. The terminal may receive a unicast service from the base station while staying at the primary carrier.

E-MBS Service Reception Start/End Report using another method other than using

E-MBS REP/RSP messages

First, the terminal may receive E-MBS service reception start command from an upper layer, and accordingly perform the carrier switching operation to receive the E-MBS service.

If the terminal has not started the reception of the E-MBS service yet (i.e., in an E-MBS service off-state), the terminal may wait for the E-MBS service reception start command from the upper layer. Upon receiving the E-MBS service reception start command from the upper layer, the terminal may send an E-MBS service reception signal to the base station to report the start of the E-MBS service reception to the base station. Here, the terminal may use UL control channel, MAC extended header or the like, as well as the MAC control message, to report the E-MBS service reception start.

Upon receiving the E-MBS service reception signal, the base station may send a response signal to the E-MBS service reception signal to the terminal.

When the terminal receives the response signal from the base station, the terminal may start performing the carrier switching operation between a primary carrier and a secondary carrier. The secondary carrier indicates a carrier on which the E-MBS service is sent.

While the terminal is currently receiving the E-MBS service (i.e., in E-MBS service on-state), if the terminal receives an E-MBS service reception end command from the upper layer, the terminal may send E-MBS service reception end signal to the base station. Here, the E-MBS service reception end signal may be sent to the base station by using UL control channel, MAC extended header or the like, as well as MAC control message.

Upon receiving the E-BMS service reception end signal, the base station may stay on the primary carrier without performing the carrier switching operation between the primary carrier and the secondary carrier.

Figure 4:
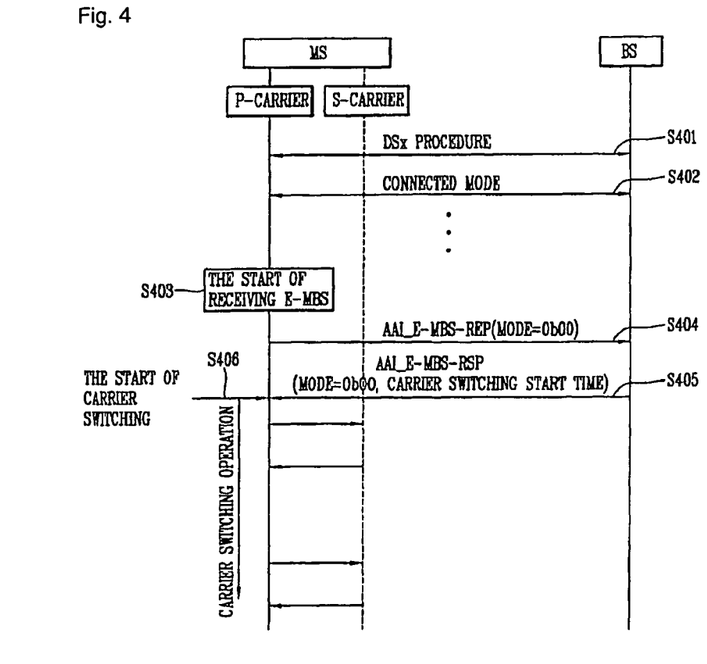
FIG. 4 is a flowchart showing a procedure that the terminal starts a carrier switching mode upon starting E-MBS service reception in accordance with one exemplary embodiment.

FIG. 4 is a flowchart showing a procedure that the terminal starts a carrier switching mode upon starting E-MBS service reception in accordance with one exemplary embodiment.

First, the terminal may perform an E-MBS service connection with the base station through DSx procedure. Here, the terminal and the base station may exchange DSA REQ/DSA RSP messages for performing the E-MBS service connection. Also, they may exchange other messages as well as the DSA REQ/DSA RSP messages.

Even when the terminal in the carrier switching mode is in the connected mode with the base station (S402), the terminal may not perform the carrier switching operation until receiving the E-MBS service. That is, the terminal can receive a unicast service from the base station via the primary carrier.

When the terminal start receiving the E-MBS service (S403), the terminal may send E-MBS REP message to the base station to request for assignment of carrier switching start time information, namely, to report the E-MBS service reception start (S404).

Upon reception of the E-MBS REP message, the base station may determine that the terminal receives the E-MBS service, thus to send E-MBS RSP message including the carrier switching start time information to the terminal (S405).

The terminal may then perform the carrier switching operation at a time point indicated in the carrier switching start time information (S406).

That is, the terminal may receive the E-MS service on the secondary carrier, and switches to the primary carrier in a non-subscribed E-MBS service reception interval, thereby receiving the unicast service from the base station. Similarly, the terminal may receive the unicast service from the base station via the primary carrier in the non-subscribed E-MBS service interval, and switch to the secondary carrier in a subscribed E-MBS service reception interval, thereby receiving the E-MBS service.

Figure 5:
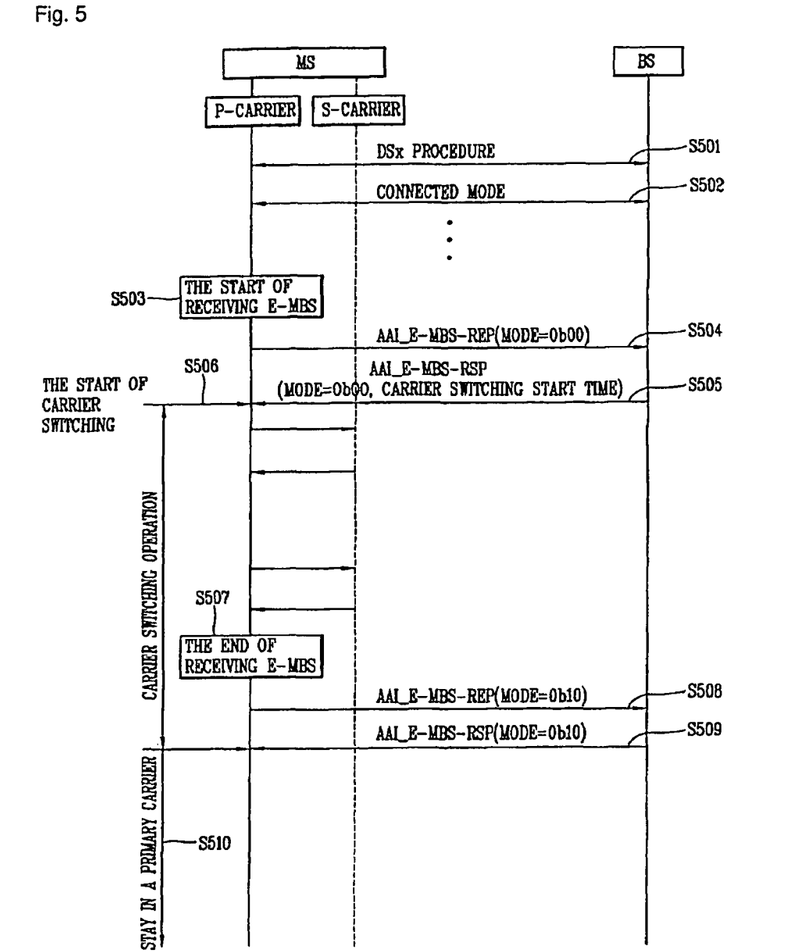
FIG. 5 is a flowchart showing a procedure that a terminal stays at a primary carrier after ending a carrier switching mode in case where the terminal ends the E-MBS service reception, in accordance with one exemplary embodiment.

FIG. 5 is a flowchart showing a procedure that a terminal stays at a primary carrier after ending a carrier switching mode in case where the terminal ends the E-MBS service reception, in accordance with one exemplary embodiment.

S501-S506 are the same as S401-S406, so description will be given of different steps and operations hereinafter.

When the terminal ends the E-MBS service reception (S507), the terminal may send E-MBS REP message to the base station to report the E-MBS carrier switching end (S508).

That is, the terminal may send the E-MBS REP message to the base station, in order to report a time point of ending the E-MBS carrier switching without releasing the E-MBS connection assigned through AAI_DSA-REQ/RSP procedure with the base station.

Upon reception of the E-MBS REP message, the base station may send E-MBS RSP message to the terminal responsive to the E-MBS REP message (S509).

Upon reception of the E-MBS RSP message from the base station, the terminal may then end the carrier switching mode and stay at the primary carrier (S510).

That is, after ending the carrier switching mode, the terminal may receive the unicast service from the base station via the primary carrier.

Figure 6:
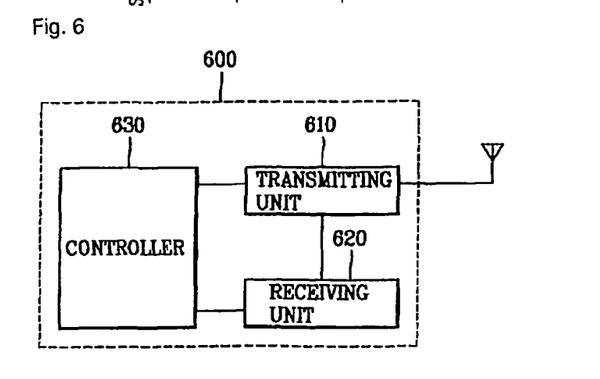
FIG. 6 is an internal block diagram of a terminal in accordance with one exemplary embodiment.

FIG. 6 is an internal block diagram of a terminal in accordance with one exemplary embodiment.

First, a terminal 600 may include a transmitting unit 610, a receiving unit 620 and a controller 630.

The transmitting unit 610 may send a first message including report mode information, which indicates start, change or end of E-MBS service reception, to the base station. Here, the first message may be a MAC control message or an E-MBS report message (e.g., AAI_E-MBS REP). Also, the first message may be in a form of header. Also, the first message may be an uplink (UL) control channel or a MAC extended header.

The report mode information may indicate information for requesting assignment of a carrier switching start time from the base station or indicating an end of a carrier switching for E-MBS service reception.

The receiving unit 620 may receive a second message indicating a response to the first message from the base station. Here, the second message may be a MAC control message or an E-MBS response message (AAI_E-MBS-RSP). Also, the second message may be in a form of header.

The controller 630 may be configured to start or end a carrier switching mode of performing a carrier switching operation between a primary carrier and a secondary carrier depending on reception or non-reception of E-MBS service, in an E-MBS service connected mode with the base station.

Here, the carrier switching mode may indicate that the terminal performs a carrier switching operation between a primary carrier and the secondary carrier (E-MBS carrier), namely, the terminal receives E-MBS bursts via the subcarrier in a subscribed E-MBS service interval, and receives a unicast service assigned via the primary carrier in a non-subscribed E-MBS service interval.

Also, the controller 630 may control the transmitting unit 610 to generate the first message and send the same to the base station when starting or ending the E-MBS service reception.

The controller 630 may also control the receiving unit 610 to receive a unicast service from the base station via a primary carrier before the carrier switching mode is started or after the carrier switching mode is ended.

The invention claimed is:

1. A method for operating a terminal for receiving E-MBS (enhanced-multicast and broadcast service) service in a multicarrier system, the method comprising:
    establishing, by the terminal, E-MBS service connection with a base station;
    transmitting, by the terminal to the base station, an E-MBS report message including report mode information related with a carrier switching operation,
    wherein the report mode information indicates that the terminal requests the base station to assign the carrier switching operation start time or the terminal ends the carrier switching operation;
    receiving, by the terminal from the base station, an E-MBS response message in response to the E-MBS report message; and
    starting, by the terminal, a carrier switching operation upon starting to receive the E-MBS service and stopping the carrier switching operation upon terminating the E-MBS-service,
    wherein the carrier switching operation start time is 4 least significant bits of a superframe number at which the terminal starts the carrier switching operation.

2. The method of claim 1, wherein the carrier switching operation is that the terminal switches to the secondary carrier to receive E-MBS data and switches to a primary carrier after receiving the E-MBS data.

3. The method of claim 1, wherein after the terminal stops the carrier switching operation, the terminal stays in the primary carrier until the terminal starts carrier switching operation again.

4. The method of claim 1, further comprising:
    receiving, from the base station, a unicast service on the primary carrier before the terminal starts carrier switching operation.

5. The method of claim 1, wherein the establishing of the E-MBS service connection with the base station comprises:
    transmitting a DSA (dynamic service addition) request message to e base station to request the E-MBS service connection establishment; and
    receiving a DSA response message from the base station responsive to the DSA request message.

6. The method of claim 1, wherein the establishing of the E-MBS service connection with the base station comprises:
    receiving an unsolicited DSA request message for requesting the E-MBS service connection establishment from the base station; and
    transmitting a DSA response message to the base station responsive to the unsolicited DSA response message.

7. A terminal for receiving E-MBS service in a multicarrier system, the terminal comprising:
    a transmitting unit configured to send, to a base station, an E-MBS report message including report mode information related with a carrier switching operation;

a receiving unit configured to receive, from the base station, an E-MBS response message in: response to the E-MBS report message; and a controller configured to provide control to start a carrier switching operation upon starting to receive the E-MBS service and to stop the carrier switching operation upon terminating the E-MBS service, wherein the report mode information, indicates that the terminal requests the base station to assign the carrier switching operation start time or the terminal ends the carrier switching operation, and wherein the carrier switching operation start time is 4 least significant bits of a superframe number at which the terminal starts the carrier switching operation.

8. The terminal of claim 7, wherein the carrier switching operation is that the terminal switches to the secondary carrier to receive E-MHS data and switches to a primary carrier after receiving the E-MBS data.

9. The terminal of claim 7, the controller controls the receiving unit to receive, from the base station, a unicast service on the primary carrier until the terminal starts carrier switching operation again after the terminal stops the carrier switching operation.

10. The terminal of claim 7, the controller controls the receiving unit to receive, from the base station, a unicast service on the primary carrier before the terminal starts carrier switching operation.

\* \* \* \* \*